(12) United States Patent
Lake et al.

(10) Patent No.: US 8,471,551 B2
(45) Date of Patent: Jun. 25, 2013

(54) MAGNETIC POSITION MONITORING SYSTEM AND METHOD

(75) Inventors: Gary B. Lake, Houston, TX (US); Brock Alan Peoples, Sapulpa, OK (US); John E. Burris, Tulsa, OK (US); David Zach Anderson, Tulsa, OK (US); James T. Sloan, Tulsa, OK (US); Tyler C. Roberts, Skiatook, OK (US); Grant R. Thompson, Tulsa, OK (US); Anthony S. Coghill, Tulsa, OK (US); Jeremy R. Johnson, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 349 days.

(21) Appl. No.: 12/869,373

(22) Filed: Aug. 26, 2010

(65) Prior Publication Data

US 2012/0049841 A1    Mar. 1, 2012

(51) Int. Cl.
*G01B 7/14* (2006.01)
(52) U.S. Cl.
USPC .................................................. 324/207.24

(58) Field of Classification Search
USPC .......................................... 324/207.2, 207.24
See application file for complete search history.

(56) References Cited

U.S. PATENT DOCUMENTS

| | | | |
|---|---|---|---|
| 4,793,241 A * | 12/1988 | Mano et al. | 92/5 R |
| 4,820,980 A * | 4/1989 | Dodson-Edgars | 324/207.24 |
| 5,532,585 A * | 7/1996 | Oudet et al. | 324/207.22 |
| 6,215,299 B1 * | 4/2001 | Reynolds et al. | 324/207.2 |
| 6,690,160 B2 * | 2/2004 | Gray et al. | 324/207.24 |
| 6,919,719 B2 * | 7/2005 | Reininger | 324/207.2 |
| 7,104,331 B2 | 9/2006 | Bussear et al. | |
| 7,454,979 B2 * | 11/2008 | Frank et al. | 73/779 |
| 2006/0157240 A1 | 7/2006 | Shaw et al. | |
| 2008/0308271 A1 * | 12/2008 | Chouzenoux et al. | 166/250.02 |
| 2009/0128141 A1 * | 5/2009 | Hopmann et al. | 324/207.24 |

* cited by examiner

*Primary Examiner* — Jay Patidar
(74) *Attorney, Agent, or Firm* — Cantor Colburn LLP

(57) ABSTRACT

A position monitoring system includes a tubular with a cavity formed therein, a magnet movable relative to the tubular, and a sensor sensible of a magnetic field of the magnet. A housing positioned within the cavity sealably isolates the sensor from environmental properties while permitting the sensor to sense the magnetic field of the magnet.

21 Claims, 2 Drawing Sheets

MAGNETIC POSITION MONITORING SYSTEM AND METHOD

BACKGROUND

Many devices are available for sensing position of a member relative to another member, and most work adequately for their intended application. Applications that have extreme environments, however, limit what sensors can be employed for that particular application. For example, the hydrocarbon production and Carbon Dioxide sequestration industries require such devices to function in environments having high pressures, and caustic fluids. Position monitoring devices for these applications can be quite expensive. Operators are therefore always interested in new cost effective systems and methods for these applications.

BRIEF DESCRIPTION

Disclosed herein is a position monitoring system that includes a tubular with a cavity formed therein, a magnet movable relative to the tubular, and a sensor sensible of a magnetic field of the magnet. A housing positioned within the cavity sealably isolates the sensor from environmental properties while permitting the sensor to sense the magnetic field of the magnet.

Further disclosed is a method of sensing position including isolating a sensor from environmental parameters with a housing, positioning the housing within a cavity in a tubular, positioning a magnet proximate the sensor, and sensing a magnetic field of the magnet with the sensor.

Further disclosed is a position monitoring system that includes a tubular, a member movable relative to the tubular, a magnet fixed relative to one of the tubular and the member. A sensor fixed relative to the other of the tubular and the member is sensible of a magnetic field of the magnet, and the sensor is positioned within a cavity such that no portion of either the tubular or the member is intermediate the magnet and the sensor throughout a sensible range. The position monitoring system also includes a housing sealably isolating the sensor within the cavity from environmental parameters.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
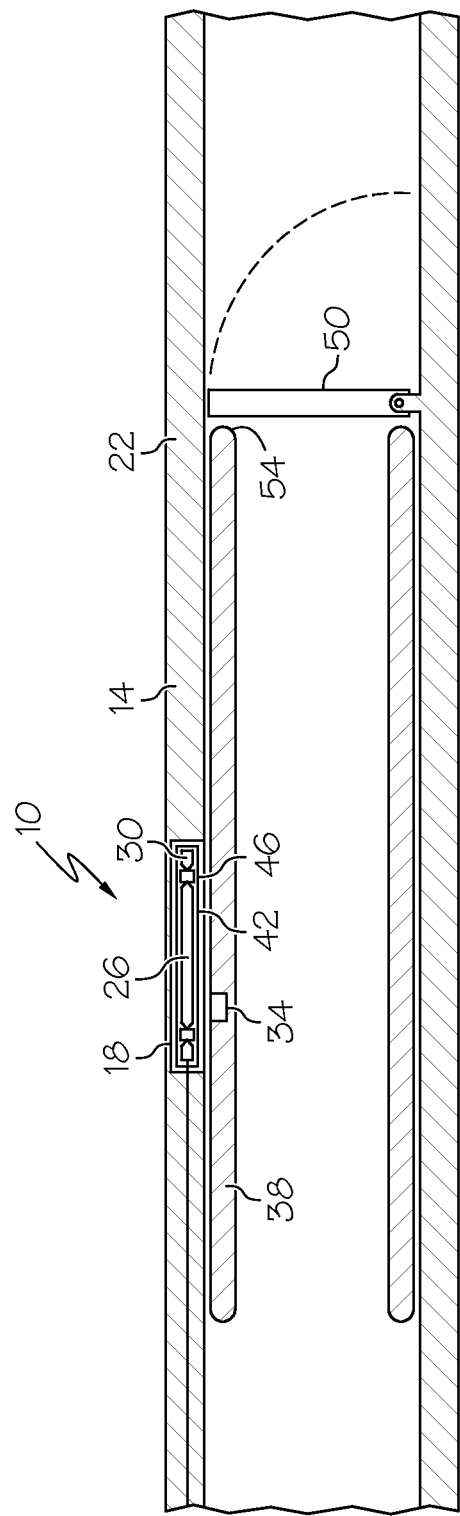
FIG. 1 depicts a cross sectioned view of a position monitoring system disclosed herein.

Referring to FIG. 1, an embodiment of a position monitoring system disclosed herein is illustrated generally at 10. The position monitoring system 10 includes, a tubular 14 with a cavity 18 in a wall 22 thereof receptive to at least one sensor 26 (with one sensor being illustrated in embodiments herein) and an optional circuit 30 in operable communication with the sensor 26. The sensor 26 is sensible of a magnet 34 that is fixedly attached to a member 38, disclosed herein as a flow tube, that is movable relative to the tubular 14 and the sensor 26. The sensor 26 and the circuit 30 are housed within a housing 42, disclosed in this embodiment as a tubular or cylindrical element. The housing 42 isolates the sensor 26 and circuit 30 from environmental parameters outside of the housing 42 such as pressure and caustic fluids, for example. In this embodiment, the housing 42 is made of a material having a relatively low magnetic permeability so that a magnetic field of the magnet 34 can be sensed through walls 46 of the housing 42. In contrast, the tubular 14, in this embodiment, is made of a material having a relatively high magnetic permeability through which the magnetic field would have difficulty penetrating. The cavity 18 is configured such that no portion of the tubular 18 is positioned intermediate the magnet 34 and the sensor 26 during sensible positions of the magnet 34. It should be noted that materials could be categorized by their relative magnetic permeability, which is a unit-less parameter. Values of relative magnetic permeability are referenced to a value of 1.000 that is associated with the relative magnetic permeability of free space (i.e., air or vacuum). Unsaturated pure iron, for example, has a relative magnetic permeability of 1000 to 5000 and is considered to have a high magnetic permeability, while Inconel® (a registered trademark of Special Metals Corporation) alloys generally have a relative magnetic permeability of 1.002 to 1.010, and are considered to have a low magnetic permeability for purposes employed herein.

In this embodiment, the tubular 14 is a portion of a downhole tool such as a drillstring or a casing, for example, that is deployable within a borehole in an earth formation. The member 38 is a flow tube of a subsurface safety valve (SSV) and is longitudinally movable relative to the tubular 14. A flapper 50 is pivotally attached to the tubular 14 and can travel between a closed position, as illustrated in the Figure (wherein the flapper is sealably engagable with an end 54 of the member 38), and an open position; indicated by an arc shown with a dashed line. Movement of the member 38 in the downhole direction (right in the figure) causes the flapper 50 to pivot to the open position, wherein fluid is allowed to flow thereby. The sensor 26 is able to sense longitudinal position of the magnet 34 relative thereto. As such, an operator can determine whether the SSV is in an open or closed position.

The tubular 14 in the embodiment illustrated can be quite large, for example, having an outer dimension on the order of seven to ten inches. In comparison, the housing 42 is quite small having an outer dimension on the order of one-half to one inch. This relationship permits the instant disclosure to be made with significantly less material costs than typical positioning systems that do not include the separate housing 42, but instead use the wall 22 of the tubular 14 itself, to house the sensor 26 and the circuit 30. This lower material cost is due to the large differential cost between materials having relatively low magnetic permeability, such as Nickel alloys, for example, and those having relatively high magnetic permeability, such as most steels, for example. Thus the small housing 42 can be made of a relatively expensive material while the large tubular 14 can be made of a relatively inexpensive material.

A shape of the housing 42 can also influence how much material is required in fabricating the same. For example, in the embodiment enclosed the housing 42 has a cylindrical or tubular shape, which is one of the best shapes for which to form a pressure vessel. Since pressures downhole can be very great (relative to ambient pressures found at earth's surface, for example), and an important feature of the housing 42 is to isolate the sensor 26 and the circuit 30 from pressures encountered outside of the housing 42, the tubular shape is a good fit.

The tubular shape allows the walls 46 to be thinner than would be required for a housing have other shapes, such as a rectangular prism, for example.

Figure 2:
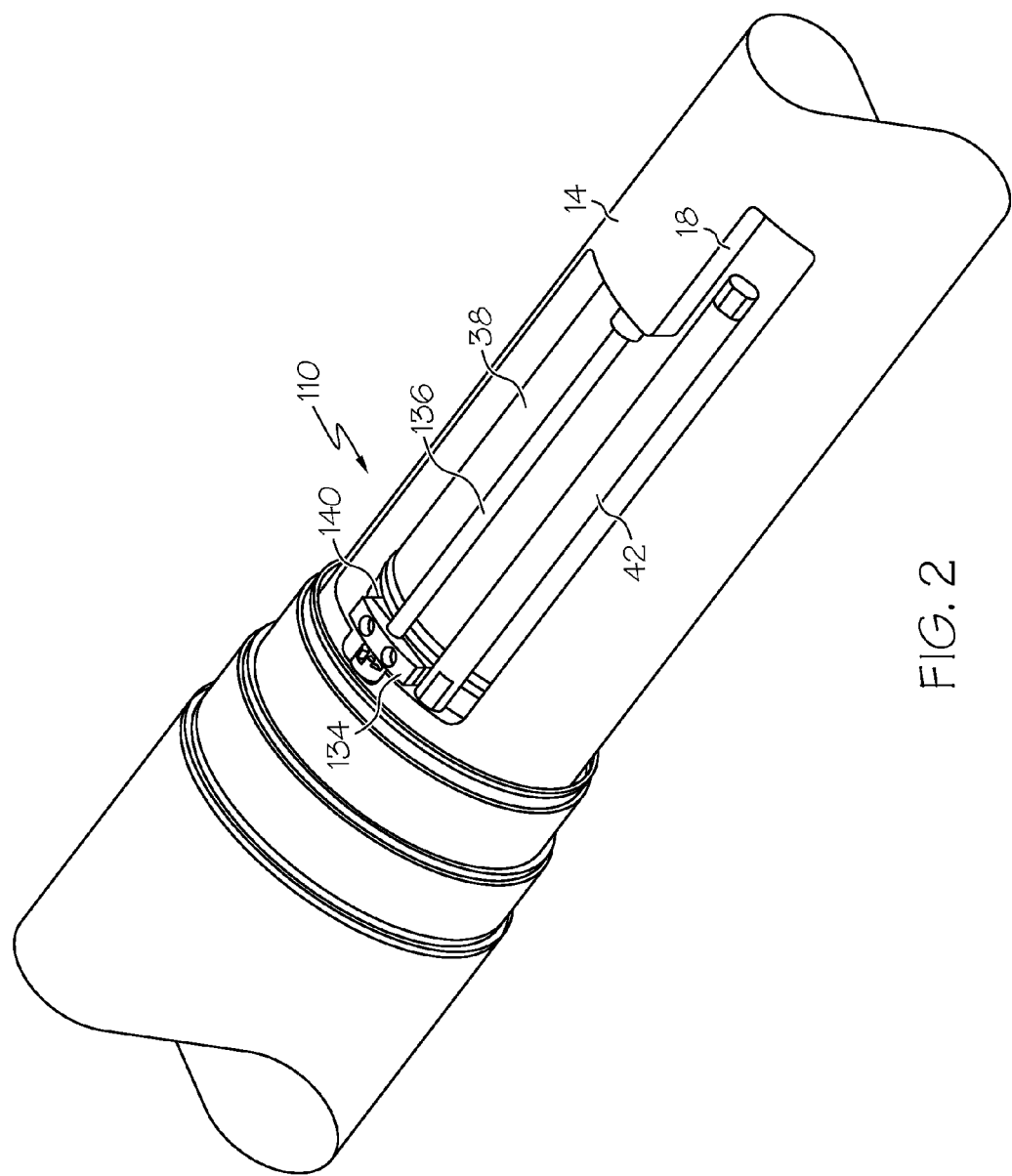
FIG. 2 depicts a perspective view of an alternate position monitoring system disclosed herein.

Referring to FIG. 2, an alternate embodiment of a position monitoring system disclosed herein is illustrated generally at 110. The system 110 has many similarities with the system 10 and like elements are referred to with the same reference characters and are not be described again here. A primary difference in this system 110 is the location of a magnet 134. The magnet 134 is still fixedly attached to the member 38 but instead of being located within the wall 46, as is the case with the system 10, the magnet 134 travels within the cavity 18 along a piston 136. The magnet 134 is coupled to the member 38 via coupling 140 to thereby assure movement of the magnet 134 is in sync with movement of the member 38. The sensor 26 and circuit 30 in this embodiment, however, are still housed within the housing 42 thereby being protected from any environmental pressure and fluids surrounding the housing 42.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A position monitoring system comprising:
a tubular with a cavity formed in a wall thereof;
a magnet movable relative to the tubular within the cavity;
a sensor sensible of a magnetic field of the magnet; and
a housing positioned within the cavity sealably isolating the sensor from environmental properties while permitting the sensor to sense the magnetic field of the magnet.

2. The position monitoring system of claim 1, wherein the housing fluidically isolates the sensor from an environment.

3. The position monitoring system of claim 1, wherein the housing isolates the sensor from environmental pressure.

4. The position monitoring system of claim 1, wherein the position monitoring system is functional within a borehole in an earth formation.

5. The position monitoring system of claim 1, wherein the magnet is positioned within a member.

6. The position monitoring system of claim 1, wherein the sensor is configured to sense multiple positions of the magnet.

7. The position monitoring system of claim 1, wherein the housing is made of a nickel alloy material.

8. The position monitoring system of claim 1, wherein the housing has a tubular shape.

9. The position monitoring system of claim 1, wherein the tubular is made of steel.

10. The position monitoring system of claim 1, wherein no portion of the tubular is intermediate the sensor and the magnet at positions wherein the sensor is sensible of the magnet.

11. The position monitoring system of claim 1, further comprising a circuit in operable communication with the sensor sealably isolated from environmental pressure within the housing.

12. The position monitoring system of claim 1, wherein the magnet moves with a flow tube of a valve.

13. The position monitoring system of claim 1, wherein the tubular has relatively high magnetic permeability relative to the housing.

14. A method of sensing position comprising:
isolating a sensor from environmental parameters with a housing;
positioning the housing within a cavity in a wall of a tubular;
positioning a magnet within the cavity proximate the sensor; and
sensing a magnetic field of the magnet with the sensor.

15. The method of sensing position of claim 14, further comprising determining position of the magnet relative to the sensor.

16. The method of sensing position of claim 15, further comprising determining position of a member of a wellbore tool relative to the tubular with the determining of position of the magnet.

17. The method of sensing position of claim 14, further comprising fluidically isolating the sensor with the housing.

18. The method of sensing position of claim 14, further comprising isolating the sensor from environmental pressure.

19. The method of sensing position of claim 14, further comprising isolating a circuit in operable communication with the sensor from environmental pressure.

20. The method of sensing position of claim 14, wherein the positioning the magnet proximate the sensor avoids allowing any portion of the tubular from extending between the sensor and the magnet.

21. A position monitoring system comprising:
a tubular;
a member movable relative to the tubular;
a magnet fixed relative to one of the tubular and the member; and
a sensor fixed relative to the other of the tubular and the member being sensible of a magnetic field of the magnet, the sensor being positioned within a cavity in a wall of the tubular and the magnet being positioned within the cavity in the wall of the tubular such that no portion of either the tubular or the member is intermediate the magnet and the sensor throughout a sensible range; and
a housing sealably isolating the sensor within the cavity from environmental parameters.

* * * * *